Figure 1:
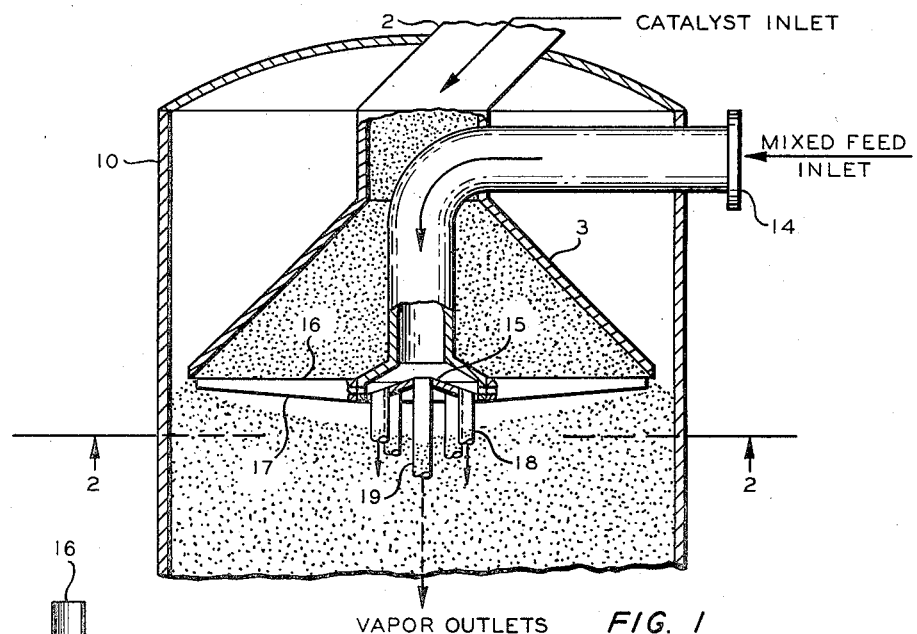

INVENTORS
K.L. JOHNSTON
G.F.L. BISHOP
BY
ATTORNEYS

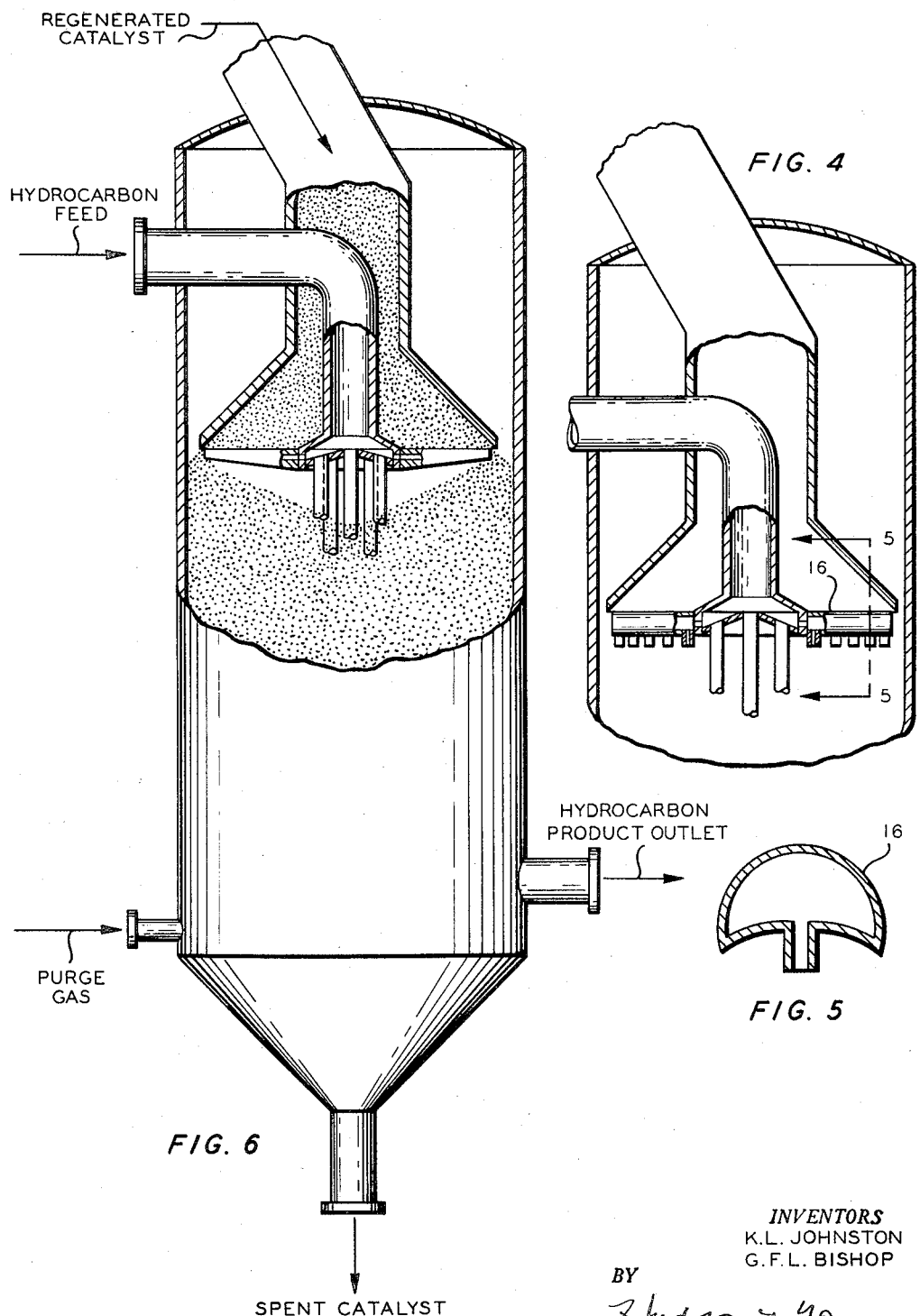

United States Patent Office 2,893,950
Patented July 7, 1959

2,893,950

METHOD AND APPARATUS FOR FEEDING FLUID REACTANTS TO A MOVING BED OF SOLID CONTACT PARTICLES

Kenneth L. Johnston and George F. L. Bishop, Woods Cross, Utah, assignors to Phillips Petroleum Company, a corporation of Delaware Application June 29, 1956, Serial No. 594,992

15 Claims. (Cl. 208—166)

This invention relates to a method and apparatus for feeding fluid reactants into moving beds of solid particulate contact masses. In one of its aspects the invention relates to a fluid distributor means disposed in a vessel in an axial manner so as to distribute over the entire cross-section of said vessel a quantity or amount of fluid proportional to the amount of particulate material at each point at which said fluid is fed thereinto in said vessel. In another aspect the invention involves a method of distributing uniformly a fluid into a moving bed of solid particulate material by feeding said fluid to a centrally or axially disposed distributing zone and from said zone feeding said fluid along radial pathways to distribute the same substantially evenly over the cross-section of the particulate mass and then from said radial positions feeding said fluid into said mass in amounts proportional to the mass present at each point of feed as more fully set forth and described below. In a further aspect of the invention provision is made in both the apparatus and method for feeding fluid uniformly over the entire cross-sectional area of the particulate mass by providing apparatus and method for feeding the said fluid to the axial portion of the vessel into the mass of particulate material which is located immediately below the axially disposed distributing zone.

In the catalytic arts, for example the conversion of hydrocarbons, there have been employed for some time now downwardly moving masses of particulate contact solids. Such solids have frequently been catalytic in character and the objective has been to catalytically crack a hydrocarbon fluid. Said fluid has often been in the form of a vapor or in the form of liquid and frequently has been in the form of a mixed feed, that is, a mixed liquid and oil vapor feed. A great many designs have been suggested for feeding such feeds into a downwardly moving mass of particulate contact solids or catalyst. Many problems have been encountered in the attempts to feed uniformly and evenly into such beds of catalyst the said fluids and at the same time avoid erosion and/or plugging up of the feeding means. One need but refer to the many patents which have been issued showing in their drawings and describing in their disclosures in great detail feeding means suggested to be employed for the said even feeding and distributing to realize at once the problem which has existed in this art heretofore.

It is an object of this invention to provide a method and an apparatus for feeding fluids into contact with moving masses of particulate contact solids. It is another object of this invention to provide a method and an apparatus for feeding fluids, especially hydrocarbon vapors, into downwardly moving masses of particulate contact solids or catalysts. It is a particular object of this invention to provide such method and means which will enable the uniform and even distribution into such solids of said fluid or fluids all the while avoiding erosion and/or plugging up of said means due to friction of the solids upon the said means and to deposition of coke or other undesired reaction byproducts upon said means or in said means, respectively.

Other aspects, objects and the advantages of the invention are apparent from a consideration of this description, the drawing, and the appended claims.

According to the present invention, there is provided a method for feeding a fluid reactant to be converted into a downwardly moving contact bed which comprises feeding said fluid into a distributing zone located substantially axially in said bed, from said zone feeding said fluid into radially disposed downwardly feeding zones, said feeding zones having an increasing feeding discharge capacity along them in the line of flow of fluid therein from said distributing zone toward the ends of said feeding zones, said feeding zones extending substantially to the periphery of said contact bed, said discharge capacity increasing as the amount of contact mass fed by any point of said feeding zones increases, thereby evenly distributing said fluid into and across said bed of contact material. Also, according to the invention, there is provided an apparatus for contacting a reactant with a downwardly moving bed of contact material which comprises a vessel, in said vessel means for feeding a mass of contact material into said vessel, means for maintaining in said vessel a bed of downwardly moving contact material, feed inlet means axially disposed in said vessel, a plurality of radially disposed feeding zones extending from said feed inlet means substantially to the periphery of said vessel in open communication with said feed inlet means forming a continuous passageway from the exterior of said vessel substantially to the periphery of said contact material, said feeding zones having an open underneath portion, said open underneath portion extending substantially the full length of said zones and said opening having an increasing size in the line of flow of reactant through said zones. In one specific embodiment of the invention the said openings are composed of tapered slots as more fully described in connection with the drawing. In another specific embodiment, in lieu of slots, a series of nozzles is disposed along a bottom portion of said zones. These nozzles can be adjustable in character or can have gradually increasing sizes as they are disposed farther from the distributor means or zone. Or, it is within the scope of the invention to provide equivalent means along said radially disposed zones and in one instance said means can comprise nozzles of identical size but placed in increasing numbers per unit of length as one approaches the periphery of the vessel.

Figure 2:
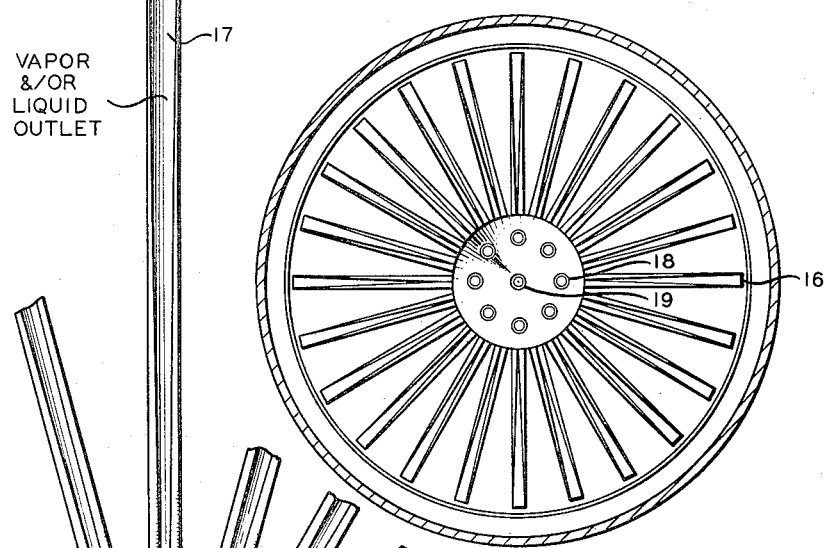
Figure 3:
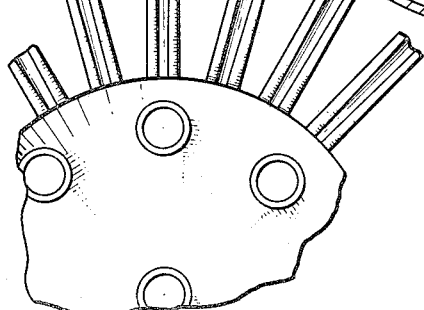

Referring now to the drawing, Figure 1 shows an upper portion of the usual vessel in which a particulate contact mass is maintained as a downwardly moving bed therein and is fed thereto from a top portion thereof and into which vessel, also at an upper portion thereof, there is fed a fluid such as a hydrocarbon vapor, or mixed feed, to be converted in contact with said bed. In Figure 2 there is shown a plan cross-sectional view of the radially disposed distributor means or pipes taken along line 2—2 of Figure 1. In Figure 3 there is shown a portion of the radial distributing means or spider viewed from underneath to show the increasing taper slot, more fully described below. In Figure 4 there is shown a portion of vessel similar to Figure 1 except that the disposition of increasing numbers of nozzles on the lower portion of the spider are shown. Figure 5 is a vertical cross-section taken along the axis of a single spider element showing how the nozzle can be recessed into the bottom portion of the said element. Finally, Figure 6 shows a complete vessel which will at once be recognized by one skilled in the art as representative of a downwardly moving bed contact mass conversion apparatus. In the said apparatus there is shown diagrammatically disposed in an upper portion a distributor or feeding means according to the invention.

Referring now to Figure 1, 10 is the shell of a substantially upright cylindrical conversion vessel or tower, 2 is a catalyst inlet pipe, and 3 is an outwardly flared apron which has a base angle somewhat larger than the angle of repose of the catalyst material solids. Thus, solids entering pipe 2 and passing by way of apron 3 are distributed into and across the cross-section of the vessel substantially as shown. Hydrocarbon vapors to be converted, for example a gas oil vapor at a temperature of about 700° F. or somewhat higher is fed by way of pipe 14 into distributing zone or vessel 15, which in the drawing is substantially circular and, as viewed in cross section, appears to be downwardly sloped on its upper walls, which extend beyond the diameter of inlet pipe 14. This is to provide a surface across which a particulate material will continue to slide with minimum erosion. Indeed, by properly selecting the angle with respect to the angle of repose of the particulate mass, it is possible to maintain at this place at which there exists substantially no hydrocarbon vapor, a substantially stationary protective portion of catalyst particles. Extending outwardly from the vessel 15, there are radially disposed distributor pipes or zones of the spider. In all of the figures of the drawing these zones are indicated by the number 16. Each zone 16 is provided at its lower portion with some form of fluid discharge so as to feed an amount of fluid into catalyst proportional to the amount of catalyst existing at the point of feed. Thus, considering a substantially cylindrical bed of downwardly moving catalyst particles along peripheries of circles having increasing diameters, there will be increasing amounts of fluid fed into the bed. Consideration of Figure 3 and the outwardly tapered slot 17 more fully exemplifies to the mind that which is intended. In Figure 4 there is shown an increasing number of nozzles disposed along the bottom portion of each zone 16. These nozzles have substantially the same rate of discharge but since there are more of them as one approaches the periphery of the vessel, there will be a correspondingly larger quantity of fluid fed into the catalyst bed. In Figure 5 the nozzle is shown recessed into the underneath portion of zone 16.

As an especial feature of the invention, there are provided (see Figure 1) downwardly extending pipes 18, which are of diameter and length such as to feed uniformly into catalyst bed, below distributor 15, an amount of fluid required to complete the even distribution of fluid into the catalyst substantially across the entire cross section thereof as it is disposed in the vessel. In Figure 2 the pipes 18 are shown disposed in a circular arrangement. It will be noted that the pipes are of length and character such as to extend substantially into a surface of the bed of catalyst. Pipe 19 is axially disposed and completes the distributing apparatus of the invention whenever the circularly disposed pipes 18 are in a circle of diameter so large that it is impractical to rely entirely upon the pipes 18 to feed the axial portion of the catalyst bed.

In an operation employing the apparatus of our invention, as described in connection with Figure 1, in a reactor which is eleven feet-six inches in diameter at the location of our feed apparatus, the ends of the radial pipes being about nine inches from the inner periphery of said reactor, the apparatus or feed distributor is comprised of twenty-four four and one-half inch diameter pipes radially mounted on the central hub. The length of each pipe is three feet and six inches. The tapered opening employed on the underside of each pipe increases from three-fourths inch at the hub to four and one-half inches (pipe diameter) at the outer edge. The pipe ends are open. The taper is effected by machining or grinding the pipe. Located below the hub and extending into the catalyst bed are the feed lines four and one-half inches in diameter. The central line is twenty-six inches long and the shorter tubes are seventeen and one-half inches long. A virgin gas oil having an API gravity (60° F./ 60° F.) or 33° is converted in the presence of an acid-treated Halloysite base natural catalyst ranging in particle size from 4 to 10 Tyler mesh. The gas oil is fed to the catalytic cracking system at 725° F. in mixed vapor and liquid form by way of our above-described feed distributor. The gas oil is maintained for a residence time of ten seconds within the cracking zone. The exit temperature of the cracked product effluent is 910° F. Using our feed apparatus to more evenly distribute the charge fluid over and throughout the catalyst, analysis of the products of cracking indicates that there is taking place within the catalyst bed at all times, uniformly across the reactor cross section, substantially uniform conversion of each portion of the feed introduced by means of the tapered radial outlets of our feed apparatus. That is, there is no area or contact section where the catalyst to hydrocarbon ratio is too high, which will undesirably produce too much coke and light products, and there is no area or contact sectoin where the catalyst to hydrocarbon ratio is too low, which will undesirably result in less conversion of the charge fluid. Also, taking into account the endothermic nature of the cracking reaction which is effected, measurements of temperatures taken across the catalyst bed during the operation show substantially the same temperature level in the cross section of the moving bed. This indicates that the ratio of catalyst to hydrocarbon is substantially the same throughout the bed which results in better product distribution (that is, less coke and light hydrocarbons are produced) which is desired.

Inspection of the hydrocarbon feed apparatus of our invention after several months' operation shows only negligible erosion and substantially no coke deposition or plugging of our apparatus.

Reasonable variation and modification are possible within the scope of the foregoing disclosure, drawing and the appended claims to the invention the essence of which is that there have been provided a method and means for uniformly and evenly feeding and distributing into a downwardly moving bed of particulate contact mass a fluid to be converted in contact therewith, the method comprising feeding said fluid to an axially disposed distributing zone and from said zone into radial feeding zones extending from said zone substantially to the periphery of said contact material, the said zones being radially disposed around said distributing zone in a specific embodiment, there being provided also at least one feeding zone immediately below said distributing zone and in open communication therewith so as to feed a proportionate amount of fluid into the catalyst bed immediately below said distributing zone, the radially disposed distributing zone having gradually increased feeding capacity along the line of flow of fluid from the distributing zone to the periphery of the contact mass, the apparatus comprising a distributor chamber in open communication with the exterior of a contact mass containing vessel in which it is contained and also in open communication with a spider of radially disposed distributing elements, the elements being so as to feed increasing quantities of fluid from them as the fluid travels from the distributing chamber to the periphery of the contact mass in the vessel, the distributing chamber also having extending from its bottom end fluid injection means so as to feed fluid directly into the contact mass located immediately below said distributing chamber, in one embodiment the distributing elements being tapered, the taper increasing in width in the direction of the periphery of the vessel and in another embodiment the feeding zones being provided with nozzles or equivalent means substantially as shown and described herein.

We claim:

1. A method for feeding a mixed vapor and liquid reactant to be converted in a downwardly moving contact bed into said bed in a conversion zone which comprises feeding said fluid to a distributing zone located substantially axially at the upper end of said bed in said conversion zone, from said distributor zone feeding said fluid into radially disposed downwardly feeding zones, each of said feeding zones having a continuously increasing feeding discharge outlet along its underneath portion in the line of flow of fluid therein from said distributing zone toward the end of said feeding zone and said feeding zones extending substantially to the periphery of said contact bed, said discharge outlet increasing in capacity as the amount of contact mass fed by any point of said feeding zones increases, and discharging fluid downwardly substantially along the entire lengths of said feeding zones as a continuous film of gradually increasing thickness, thereby evenly distributing said fluid into and across said bed of contact material.

2. A method according to claim 1 wherein said feeding zones extend substantially horizontally to the periphery of said contact bed.

3. A method according to claim 1 wherein at least one fluid discharge zone is positioned below said distributing zone to feed fluid to the contact bed immediately below said zone.

4. A method according to claim 1 wherein said fluid is a hydrocarbon to be converted.

5. A method according to claim 1 wherein said fluid is a vaporous hydrocarbon.

6. A method according to claim 1 wherein said fluid is a mixture of liquid and vaporous hydrocarbons.

7. An apparatus for contacting a reactant with a downwardly moving bed of contact material which comprises a vessel, in said vessel means for feeding a mass of contact material into said vessel, means for maintaining in said vessel a bed of downwardly moving contact material, feed inlet means axially disposed in said vessel, a plurality of radially disposed feeding zones extending from said axially disposed feed inlet means substantially to the periphery of said vessel, said feeding zones being in open communication with said feed inlet forming a continuous passageway from the exterior of said vessel substantially to the periphery of said contact material, said feeding zones having a continuous open underneath portion, said open underneath portion extending substantially the full length of said zones, the underneath open portions having an increasing size in the line of flow of reactant through said zones.

8. An apparatus according to claim 7 wherein said underneath open portion in each of said zones is a slot of increasing taper in the direction of flow of reactant through said zones.

9. An apparatus according to claim 7 wherein the bottom of said feed inlet means is in open communication with the interior of the vessel through at least one outlet therein.

10. A reactant feeding means adapted to evenly distribute and to feed into a downwardly moving catalyst bed of particulate material in a vessel a fluid to be therein uniformly contacted with said catalyst which comprises in combination a substantially axially disposed distributing chamber, in said chamber a fluid inlet means communicating the exterior of said vessel and the interior of said distributing chamber, radially disposed feeding zones extending from said chamber to substantially the periphery of said vessel and having a continuous open underneath portion and communicating with said chamber at their chamber ends and with said vessel along substantially their entire lengths along a bottom portion of them through said continuous open underneath portion.

11. An apparatus according to claim 10 wherein the bottom of each of said zones is slotted along substantially its entire length and said slots have a tapered width which increases with distance from the said chamber in manner to feed at any given feeding pressure of fluid an amount of fluid proportional to the amount of catalyst at the point of feeding to be contacted therewith.

12. An apparatus according to claim 10 wherein the bottom of said chamber is in open communication with the bed through at least one outlet means of size and character such that the catalyst bed immediately below said chamber is also injected with an amount of fluid proportional to the amount of catalyst to be contacted therewith at the point of feeding.

13. A method for feeding a fluid reactant to be converted in a downwardly moving contact bed into said bed in a conversion zone which comprises feeding said fluid to a distributing zone located substantially axially at the upper end of said bed in said conversion zone from said distributing zone feeding said fluid into radially disposed downwardly feeding zones, each of said feeding zones having a continuous increasing feeding discharge outlet along it in the line of flow of fluid therein from said distributing zone toward the end of said feeding zone and said feeding zones extending substantially horizontally to the periphery of said contact bed, said discharge outlet increasing in capacity as the amount of contact mass fed by any point of said feeding zones increases, and discharging fluid downwardly substantially along their entire lengths as a continuous film of gradually increasing thickness, thereby evenly distributing said fluid into and across said bed of contact material.

14. An apparatus for contacting a reactant with a downwardly moving bed of contact material which comprises a vessel, in said vessel means for feeding a mass of contact material into said vessel, means for maintaining in said vessel a bed of downwardly moving contact material, feed inlet means axially disposed in said vessel, a plurality of radially disposed feeding zones extending substantially horizontally from said axially disposed feed inlet means substantially to the periphery of said vessel, said feeding zones being in open communication with said feed inlet forming a continuous passageway from the exterior of said vessel substantially to the periphery of said contact material, said feeding zones having a continuous open underneath portion, said open underneath portion extending substantially the full length of said zones, the continuous underneath open portions having an increasing size in the line of flow of reactant through said zones.

15. An apparatus for contacting a reactant with a downwardly moving bed of contact material which comprises a vessel, in said vessel means for feeding a mass of contact material into said vessel, means for maintaining in said vessel a bed of downwardly moving contact material, feed inlet means axially disposed in the upper portion of said vessel, a plurality of radially disposed substantially rectilinear feeding elements extending substantially horizontally from said axially disposed feed inlet means substantially to the periphery of said vessel, said feeding elements being in open communication with said feed inlet forming a continuous passageway from the exterior of said vessel substantially to the periphery of said contact material, said feeding elements having a slotted open underneath portion, said slotted open underneath portion extending substantially the full length of said elements, the underneath slotted open portions having an increasing size in the line of flow of reactant through said zones.

References Cited in the file of this patent

UNITED STATES PATENTS

| | | |
|---|---|---|
| 1,493,458 | Evans et al. | May 6, 1924 |
| 1,859,576 | Treat | May 24, 1932 |
| 2,094,128 | Lazier et al. | Sept. 28, 1937 |
| 2,426,848 | Tuttle | Sept. 2, 1947 |
| 2,518,304 | Goins et al. | Aug. 8, 1950 |
| 2,732,331 | Wesh | Jan. 24, 1956 |
| 2,736,686 | Weber | Feb. 28, 1956 |
| 2,761,769 | Elder | Sept. 4, 1956 |
| 2,770,582 | Eastwood | Nov. 13, 1956 |
| 2,771,406 | Ray | Nov. 20, 1956 |
| 2,776,876 | Bowles et al. | Jan. 8, 1957 |
| 2,789,889 | Bergstrom et al. | Apr. 23, 1957 |